(12) United States Patent
Llorente Gonzalez

(10) Patent No.: US 8,033,078 B2
(45) Date of Patent: Oct. 11, 2011

(54) METHOD OF MOUNTING ELEMENTS INSIDE A WIND GENERATOR TOWER

(75) Inventor: Jose Ignacio Llorente Gonzalez, Pamplona (ES)

(73) Assignee: Gamesa Innovation & Technology, S.L., Pamplona (Navarra) (ES)

( * ) Notice: Subject to any disclaimer, the term of this patent is extended or adjusted under 35 U.S.C. 154(b) by 0 days.

(21) Appl. No.: 11/992,076

(22) PCT Filed: Sep. 14, 2006

(86) PCT No.: PCT/ES2006/000516
§ 371 (c)(1),
(2), (4) Date: Mar. 14, 2008

(87) PCT Pub. No.: WO2007/034011
PCT Pub. Date: Mar. 29, 2007

(65) Prior Publication Data
US 2009/0031668 A1 Feb. 5, 2009

(30) Foreign Application Priority Data
Sep. 16, 2005 (ES) .................................. 200502259

(51) Int. Cl.
*E04B 1/00* (2006.01)
(52) U.S. Cl. ..................... 52/745.04; 52/79.4; 52/236.2; 52/745.01

(58) Field of Classification Search ................... 52/79.1, 52/79.4, 236.2, 745.01, 745.02, 745.04, 745.17, 52/651.01, 834, 843
See application file for complete search history.

(56) References Cited

U.S. PATENT DOCUMENTS

| | | | | |
|---|---|---|---|---|
| 3,768,016 A * | 10/1973 | Townsend et al. | | 455/25 |
| 5,509,562 A * | 4/1996 | Jolly | | 220/216 |
| 5,557,893 A * | 9/1996 | Bowls | | 52/187 |
| 6,108,988 A * | 8/2000 | Nagelski et al. | | 52/187 |
| 6,467,233 B1 * | 10/2002 | Maliszewski et al. | | 52/831 |
| 6,470,645 B1 * | 10/2002 | Maliszewski et al. | | 52/745.18 |
| 6,713,891 B2 * | 3/2004 | Kirkegaard et al. | | 290/44 |
| 7,198,134 B2 * | 4/2007 | LeMieux | | 182/8 |
| 2003/0147753 A1 | 8/2003 | Ollgaard | | |
| 2005/0247008 A1 * | 11/2005 | Fujiwara et al. | | 52/651.1 |
| 2007/0045045 A1 * | 3/2007 | Deuer | | 182/8 |
| 2007/0125037 A1 * | 6/2007 | Meiners | | 52/720.1 |
| 2007/0296220 A1 * | 12/2007 | Kristensen | | 290/55 |

FOREIGN PATENT DOCUMENTS
WO 02/38953 5/2002
* cited by examiner

*Primary Examiner* — Eileen D Lillis
*Assistant Examiner* — Branon Painter
(74) *Attorney, Agent, or Firm* — Ladas & Parry LLP

(57) ABSTRACT

A method of mounting elements inside a wind generator tower which is made from various different sections of metal. Elements such as ladders, platforms, and electric cables are fixed to auxiliary supports such as beams or rings which are in turn fixed to the above-mentioned sections so as not to reduce the fatigue strength thereof.

12 Claims, 2 Drawing Sheets

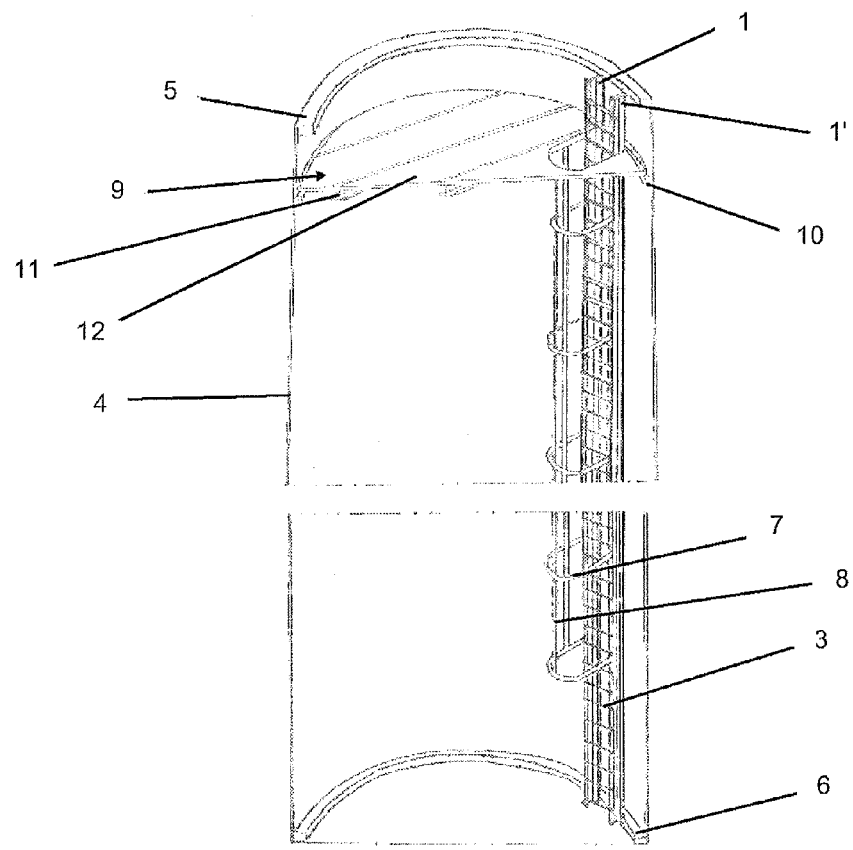
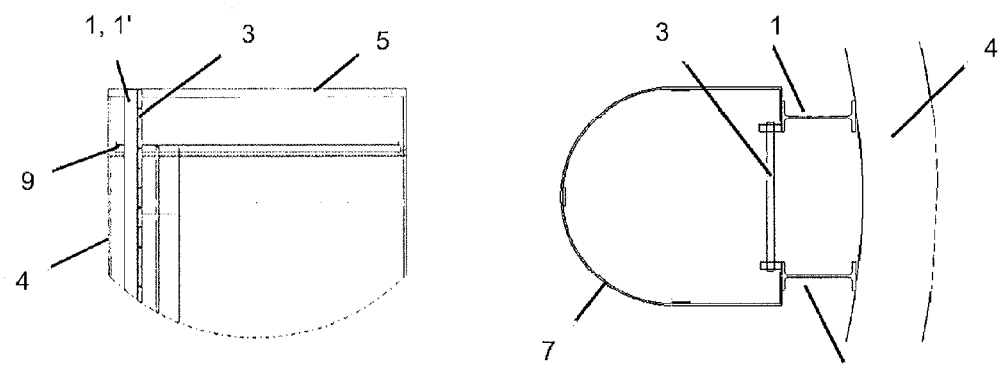 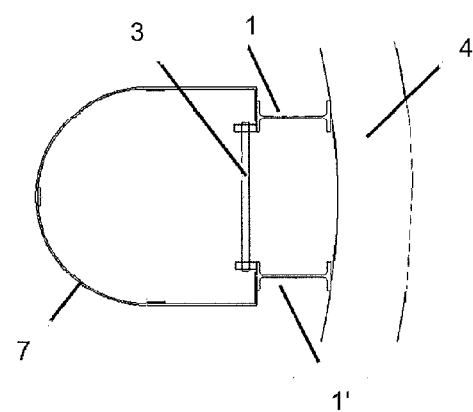
FIG. 1
FIG. 2
FIG. 3

METHOD OF MOUNTING ELEMENTS INSIDE A WIND GENERATOR TOWER

FIELD OF THE INVENTION

This invention refers to a method for mounting element inside the wind generator tower and, more specifically inside a metal tower made in various sections.

BACKGROUND OF THE INVENTION

Development and innovation in the wind generator field during recent decades has resulted in the increase of the size and power of the turbines of the same, that entails an increase in the height of the towers, which, in order to be resistant, must have thicker walls. These thicknesses are optimised using a structural calculation of the minimum tower wall thickness capable of safely supporting the loads and the vibrations to which said tower is subjected.

Wind generator towers must hold various different elements inside, including a ladder to enable different maintenance operations to be performed on said elements. In known techniques, these ladders are screwed to guides which, in turn, are joined to connecting parts welded to the inside surface of the tower. For example, document WO0238953 describes some ladders screwed to some bolts that belong to platforms which, in turn, are welded to the inside of the wind generator tower.

Fixtures of this type oblige the thickness of the tower walls to be increased due to a reduced fatigue strength of the same. The present invention proposes a new method for mounting elements in wind generator tower which resolves that problem.

SUMMARY OF THE INVENTION

The method for mounting elements such as a vertical ladder, guides for a lifting device or a horizontal platform inside the wind generator tower made of various sections of metal material according to this invention, consists of using auxiliary supports to secure said elements, with said auxiliary supports being secured to the section of the tower in a manner that does not reduce fatigue strength.

The proposed preferred auxiliary supports are horizontal rings for the platforms, vertical beams for the ladder and lifting device guides, to which other elements such as electrical cables shall be secured.

One advantage of this invention lies in that it enables a reduction of the tower thickness as it eliminates weakening caused by the welds of the fixture elements used in previous techniques.

Another advantage of this invention is that is simplifies the manufacturing and assembly process of the tower as it avoids having to weld a high number of fixture elements which entails time and precision, because practically all of the mounting operations could be performed in the manufacturing plant, thus avoiding operations at the installation site which are always more costly and difficult.

Other characteristics and advantages of this invention become apparent in the detailed description and the accompanying figures that follow.

DESCRIPTION OF FIGURES

FIG. 1 shows the inside of a wind generator tower with a ladder and a platform secured to auxiliary supports according to this invention.

FIG. 2 is a partial view of the lateral section of a wind generator tower with a ladder and a platform secured to auxiliary supports according to this invention.

FIG. 3 is a top plan view of a ladder's fixture to an auxiliary support.

DETAILED DESCRIPTION OF THE INVENTION

Figure 4:
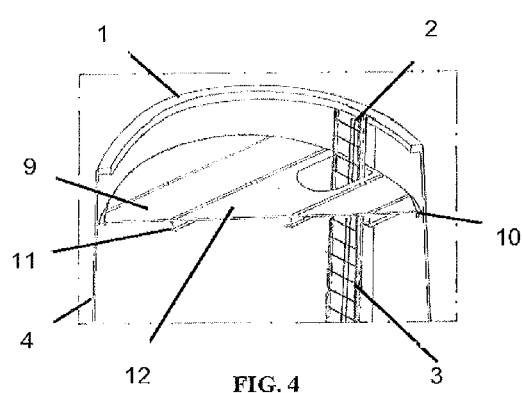
FIG. 4 shows the inside of a wind generator with a ladder secured to just one beam.

Metal wind generator towers are formed by a plurality of sections 4 with lengths ranging between 10 and 30 m, in a cylindrical or troncoconical form with upper and lower flanges 5, 6, for connection with other sections.

According to a first embodiment of the invention, the ladder 3 is not directly secured to the section 4 of the tower but to two beams 1, 1'.

The beams 1, 1', preferably with a double T profile, are secured to the upper flange 5 and to the lower flange 6 of the section 4 of the tower in a manner in parallel to the walls. They are secured rigidly to the upper flange 5, with welds or bolts for example, and are secured horizontally to the lower flange 6 in a manner which allows lengthways displacement.

This manner of securing the beams 1, 1' allows bending of the section 4 caused by the operational loads which act on the tower, equally allowing dilation and contraction with changes in temperature, without the aforementioned beams 1, 1' suffering external operational loads. The only external loads on said beams 1, 1' will be produced by the people using the ladder 3.

Figure 6:
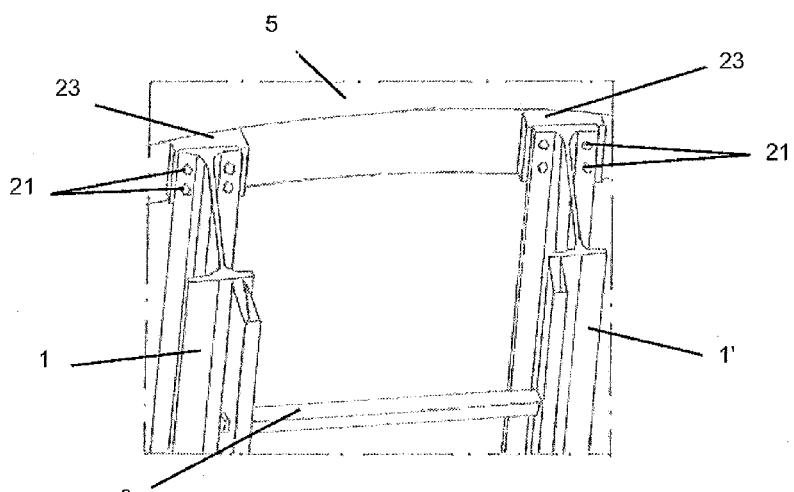
FIG. 6 shows a practical embodiment of the ladder's fixture to the upper flange of a tower section.

FIG. 6 shows a rigid fixture of the beams 1, 1' on the upper flange 5 using bolts 21 and support chocks 23 appropriately to couple the flat flange of the double T beams 1, 1' to the curved surface of the flange 5.

Figure 7:
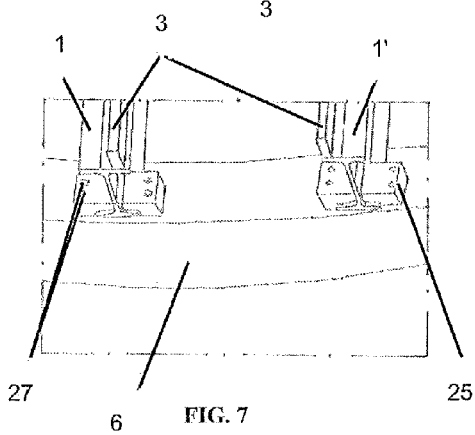
FIGS. 7 and 8 are detailed views of different embodiments for the fixture of the beams to the lower flanges of the different tower sections.

FIG. 7 shows a horizontal rigid fixture of the beams 1, 1' to the lower flange 6 using bolts 27 and clamps 25 which allow a lengthways displacement of the beams 1, 1' and are designed appropriately on the surface supported on the curved surface of the flange 6.

Figure 8:
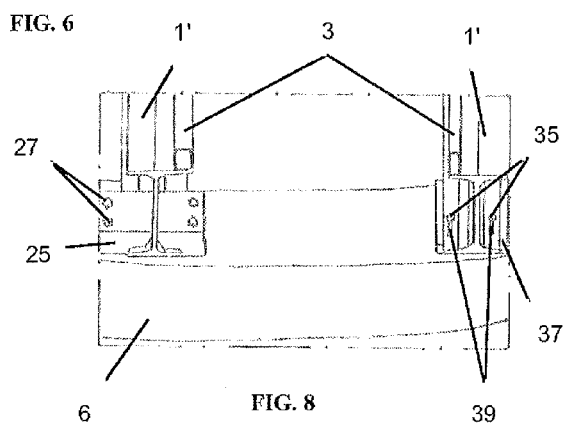

FIG. 8 shows a combination of horizontal fixtures of the beams 1, 1' to the lower flange 6, using bolts 35 and support chocks 37 with a gap in a lengthways direction provided by the holes pierced 39 on the flange of the double T for beam 1', and using bolts 27 for the fixture of a clamp 25 which allows lengthways displacement of beam 1 in relation to the lower flange 6.

The ladder 3, which may include an external protection for the operator formed by some profiles 7 and 8, is secured to the aforementioned beams 1, 1' using any appropriate means. As no welds are used at various points inside the section 4 of the tower, some weaknesses are prevented, thus enabling a reduction of the thickness whilst maintaining the same fatigue strength, which is indicated by the shell plate welds.

Figure 5:
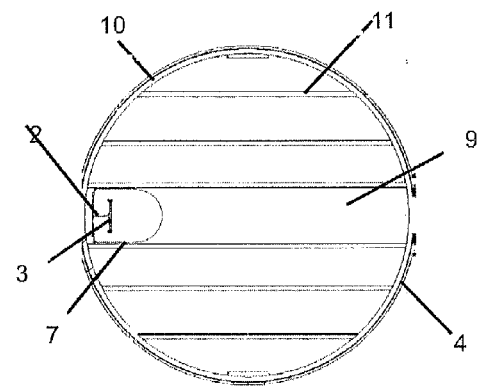
FIG. 5 is a plan view of the tower shown in FIG. 4.

In the second embodiment of the invention shown in FIGS. 4 and 5, only one beam 2 is used, which is secured to the ladder 3. The beam 2 is secured to the upper flange 5 and the lower flange 6 in the same way as the beams 1, 1' of the first embodiment.

Another important element that must be mounted inside the wind generator tower are support platforms 9. In one embodiment of the invention, the platforms 9 are supported on rings 10 secured to the inside of the section 4 of the tower by a means such as a continuous weld bead for example, in a manner that does not reduce its fatigue strength by being a uniform fixture around the entire section of the tower, and due to the fact that it is also located in an area close to the upper flange 5, the thickness of the wall of the tower is mainly conditioned by the stresses on the flange.

The fixture of the rings 10 to the inside of the section 4 of the tower can be executed by means of a similar weld to that used between the plates, which obtains a higher quality (greater fatigue strength) than the maximum permitted limit on the connecting part welds on the plates.

The support platforms 9 may be formed by various beams 11 upon which the base 12 of the platform is located. Alternatively, they may be formed by a self supporting panel of composite material supported on the ring 10.

In another embodiment of the invention (not shown) the platforms 9 are supported by the upper flange by means of auxiliary elements secured to it.

In any of the embodiments, the electrical cables of the wind generator (not shown) will run down from the upper part of the tower to the base of the same, secured to connectors which in turn will be connected to the beams of the ladder and the platforms located along the different sections 4 of the tower, thus preventing all types of welds that reduce the fatigue strength of the tower.

In the preferred embodiments described above, modifications can be made within the range defined in the following claims.

The invention claimed is:

1. A method of mounting elements inside a wind generator tower of various sections (4), comprising the steps of:
   connecting the sections (4) by means of two circular flanges (5, 6) and holding a ladder (3) and a platform (9) inside;
   securing the ladder (3) and platform (9) on auxiliary supports (2; 1, 1'; 10) that comprise at least one longitudinal beam (2; 1, 1'), and securing the same at least one longitudinal beam (2; 1, 1') to both of the two circular flanges (5, 6) of each section (4) of the tower in a manner that does not reduce its fatigue strength; and securing the same at least one longitudinal beam (2; 1, 1') to the upper circular flange (5) in a rigid manner and to the lower circular flange (6) in a manner that allows its movement lengthways along the longitudinal beam but prevents horizontal movement.

2. A method of mounting elements inside a wind generator tower according to claim 1, further comprising the step of securing the ladder (3) to the at least one longitudinal beam or beams (2; 1, 1').

3. A method of mounting elements inside a wind generator tower according to claim 2, further comprising the step of securing electrical cables with connectors to said auxiliary supports (2; 1, 1'; 10).

4. A method of mounting elements inside a wind generator tower according to claim 1, further comprising the step of securing circumferentially at least one ring (10) included in said auxiliary supports to a section (4) of the tower in areas close to the upper circular flange (5).

5. A method of mounting elements inside a wind generator tower according to claim 4, further comprising the step of securing said platform (9) to said at least one ring (10).

6. A method of mounting elements inside a wind generator tower according to claim 5, further comprising the step of securing electrical cables with connectors to said auxiliary supports (2; 1, 1'; 10).

7. A method of mounting elements inside a wind generator tower according to claim 4, further comprising the step of securing electrical cables with connectors to said auxiliary supports (2; 1, 1'; 10).

8. A method of mounting elements inside a wind generator tower according to claim 1, further comprising the step of supporting at least one ring (10) included in said auxiliary supports by the upper circular flange (5).

9. A method of mounting elements inside a wind generator tower according to claim 8, further comprising the step of securing said platform (9) to said at least one ring (10).

10. A method of mounting elements inside a wind generator tower according to claim 9, further comprising the step of securing electrical cables with connectors to said auxiliary supports (2; 1, 1'; 10).

11. A method of mounting elements inside a wind generator tower according to claim 8, further comprising the step of securing electrical cables with connectors to said auxiliary supports (2; 1, 1'; 10).

12. A method of mounting elements inside a wind generator tower according to claim 1, further comprising the step of securing electrical cables with connectors to said auxiliary supports (2; 1, 1'; 10).

* * * * *